(12) United States Patent
Beard et al.

(10) Patent No.: US 7,308,829 B1
(45) Date of Patent: Dec. 18, 2007

(54) DIFFERENTIAL PRESSURE INDICATOR AND METHOD OF MANUFACTURE

(75) Inventors: John Beard, Kearney, NE (US);
Farrell F. Calcaterra, Kearney, NE (US); Steven M. Todd, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 0 days.

(21) Appl. No.: 11/488,230

(22) Filed: Jul. 18, 2006

(51) Int. Cl.
*G01L 7/16* (2006.01)

(52) U.S. Cl. .............................. 73/716; 73/744; 73/736

(58) Field of Classification Search ................. 73/716, 73/744, 736
See application file for complete search history.

(56) References Cited

U.S. PATENT DOCUMENTS

| | | | |
|---|---|---|---|
| 3,547,069 A | 12/1970 | Tao | |
| 3,591,003 A | 7/1971 | Cooper | |
| 3,704,458 A | 11/1972 | Buchanan et al. | |
| 4,392,034 A * | 7/1983 | Payne | ........................ 200/81.4 |
| 4,480,160 A * | 10/1984 | Stifelman | ................. 200/82 R |
| 4,626,344 A | 12/1986 | Fick et al. | |
| 4,783,256 A | 11/1988 | Cooper et al. | |
| 5,584,318 A | 12/1996 | Brandt | |
| 5,718,822 A | 2/1998 | Richter | |
| 5,858,224 A | 1/1999 | Schwandt et al. | |
| 6,086,752 A | 7/2000 | Dell et al. | |
| 6,604,486 B1 | 8/2003 | Krisko et al. | |
| 2006/0059995 A1 | 3/2006 | Gustafson et al. | |

\* cited by examiner

*Primary Examiner*—Andre J. Allen
(74) *Attorney, Agent, or Firm*—Reinhart Boerner Van Deuren P.C.

(57) ABSTRACT

A differential pressure indicator and method of configuring a differential pressure indicator is provided. The differential pressure indicator is configurable to provide open circuit or closed circuit logic and includes a housing, a pressure responsive element, a post, first, second and third electrical contacts and an electrical insulator from an insulative material. The electrical insulator separates the third electrical contact from either the first contact or the second contact to provide a desired type of logic. The differential pressure indicator may use substantially similar components to provide either open circuit or closed circuit logic or the components may be rearranged to provide either open circuit or closed circuit logic.

27 Claims, 10 Drawing Sheets

DIFFERENTIAL PRESSURE INDICATOR AND METHOD OF MANUFACTURE

FIELD OF THE INVENTION

This invention generally relates to a differential pressure indicator. More particularly, the invention relates to a differential pressure indicator for a filtration system for indicating when to change or clean a fluid filter.

BACKGROUND OF THE INVENTION

In hydraulic circuits, differential pressure indicators are used to warn the operator that the filter is plugged and needs to be replaced or cleaned. These indicators sense the pressure differential between the fluid flow upstream from the filter and the fluid flow downstream from the filter. As the filter becomes increasingly plugged with contaminants filtered from the fluid, the restriction and the differential pressure between fluid upstream of the filter and fluid downstream of the filter increases.

Typically, these indicators incorporate a spring loaded piston. One side of the piston is plumbed to the dirty fluid on the upstream side of the filter and the other side of the piston is plumbed to the clean fluid on the downstream side of the filter. A spring opposes the movement of the piston until a particular predetermined differential pressure between the upstream and downstream sides of the filter exists. Once the differential pressure is sufficient to actuate the piston by overcoming the force of the spring, the piston can mechanically move or actuate a switch to either send an electrical signal by closing an electrical circuit or prevent an electrical signal from being sent by opening the electrical circuit to thereby alert the operator of the poor condition of the filter. Examples of this are shown in U.S. Pat. No. 3,704,458 to Buchanan et al.; U.S. Pat. No. 4,626,344 to Fick et al.; and U.S. Pat. No. 5,718,822 to Richter.

These differential pressure indicators work on a single set of logic such that they are designed for either opening an electrical circuit or closing an electrical circuit. Unfortunately, to manufacture either an indicator that opens a circuit or an indicator that closes a circuit requires significantly different components and/or design from the other. The present invention provides improvements in differential pressure indicators.

BRIEF SUMMARY OF THE INVENTION

The invention provides an improved differential pressure indicator and method of manufacture, through the use of components that allow for a differential pressure indicator having either open or closed logic by using substantially similar components. It is an aspect of the present invention that by merely re-arranging components, the differential pressure indicator may have either open logic or closed logic. The differential pressure indicator may have either open logic or closed logic by varying the material from which components are manufactured.

In one aspect, the invention provides a method of configuring a differential pressure indicator to provide either open circuit logic or closed circuit logic by selecting between differing insulating arrangements. The method includes the step of providing a housing having first and second communication ports and an internal chamber. The housing further includes first and second electrical contacts in spaced apart relation. The method further includes selecting between a first insulating arrangement wherein the first electrical contact is electrically insulated from a third electrical contact, and a second insulating arrangement wherein the second electrical contact is electrically insulated from the third electrical contact to provide for open circuit logic or closed circuit logic. The method further includes providing a pressure responsive element according to the selected insulating arrangement. The pressure responsive element being receivable in the internal chamber to divide the internal chamber into first and second pressure chambers. The pressure responsive element further including the third electrical contact. The third electrical contact is in electrical communication with an electrical terminal that is insulated from the housing. The method further includes assembling the housing and the pressure responsive element according to the selected insulating arrangement.

In another aspect, the invention provides a differential pressure indicator comprising a housing, a post, a piston, and an insulative material. The housing having an internal chamber and first and second fluid pressure communication ports communicating with the internal chamber. The housing having a first electrical contact for open circuit logic and a second electrical contact for closed circuit logic. The post is mounted to the housing and insulated relative thereto. The post serves as an electrical terminal and extends into the internal chamber. The piston is receivable in the housing and divides the internal chamber into a first pressure chamber and a second pressure chamber. The piston is movable in response to a pressure differential between the pressure chambers between a first position in which the piston is urged against the second electrical contact and a second position in which the piston is urged against the first electrical contact. The piston includes a third electrical contact adapted to complete an electrical circuit between one of the first and second electrical contacts and the post. The insulative material is arranged between the third contact and one of the first and second electrical contacts to provide for one of open and close circuit logic.

In yet another aspect, the invention provides a differential pressure indicator for sensing a pressure differential across a filter that is configurable to provide either open circuit logic or closed circuit logic comprising a housing, first, second and third electrical contact portions, a post, a piston assembly, and an electrically insulative material. The housing having an inner bore and first and second inlet ports in fluid communication with the inner bore. The first and second spaced apart electrical contact portions are within the inner bore and in electrical communication with the housing. The post is secured within the inner bore and is electrically insulated from the housing. The piston assembly is slidable within the inner bore and includes the third electrical contact portion, which is in electrical communication with the post. The piston assembly may be arranged to electrically connect the post to the first electrical contact portion and arranged to electrically connect the post to the second electrical contact portion. The electrically insulative material being arranged between the piston assembly and one of the first and second electrical contact portions such that the third electrical contact may only electrically connect the post to one of the first and second contact portions.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 4 is an exploded view of the differential pressure indicator of FIG. 3a;

FIG. 6 is an exploded view of the differential pressure indicator of FIG. 5a;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
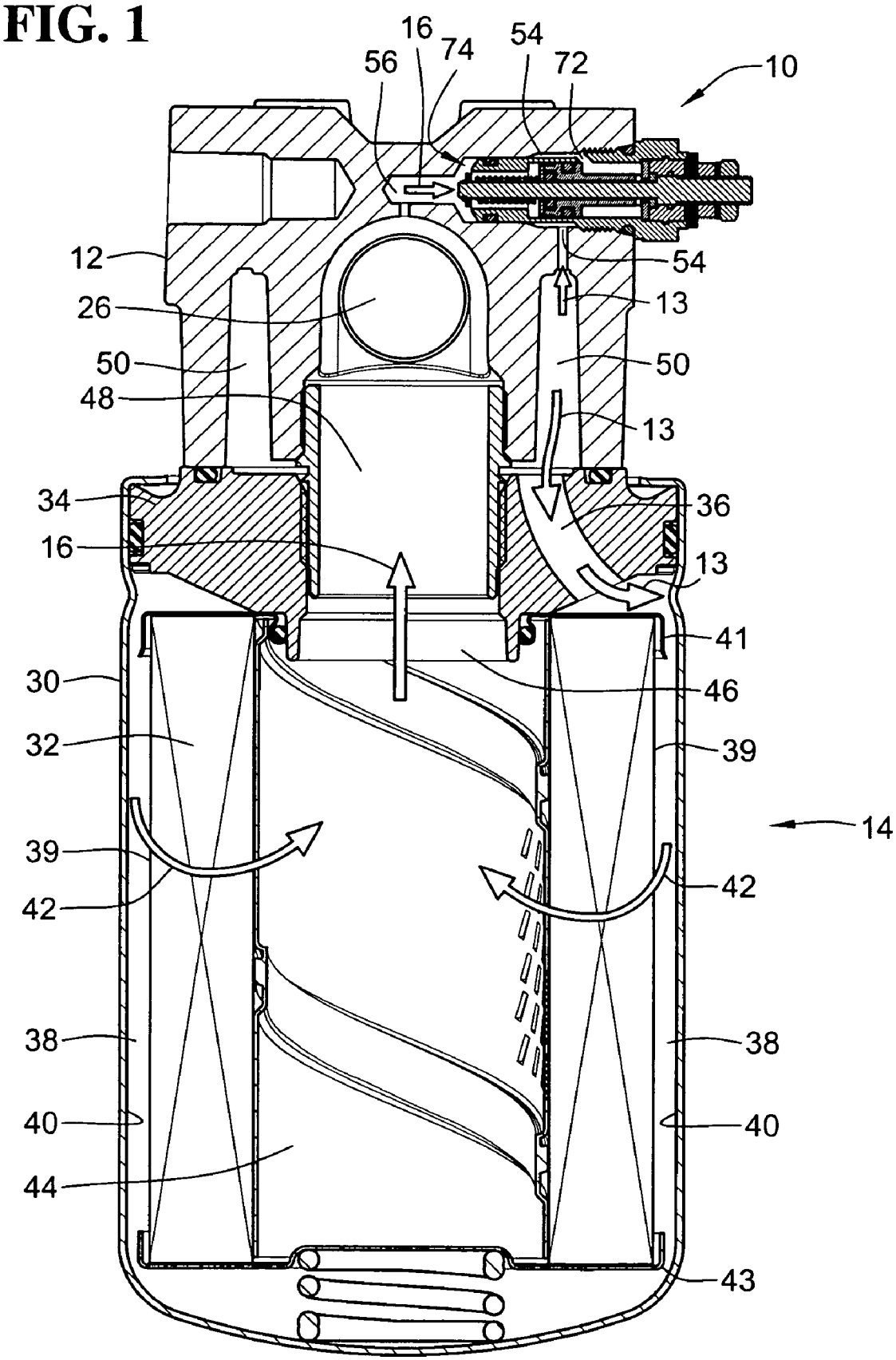
FIG. 1 is a cross-sectional illustration of a filter connected to a filter head having a differential pressure indicator taken about line 1-1 of FIG. 2.

A differential pressure indicator 10 in accordance with the present invention is illustrated in FIG. 1. The differential pressure indicator 10 is threadedly secured to a filter head 12 to monitor or sense the pressure differential between a dirty fluid flow, indicated by arrows 13, upstream from a filter 14 and a clean fluid flow, indicated by arrows 16, downstream from the filter 14.

Figure 2:
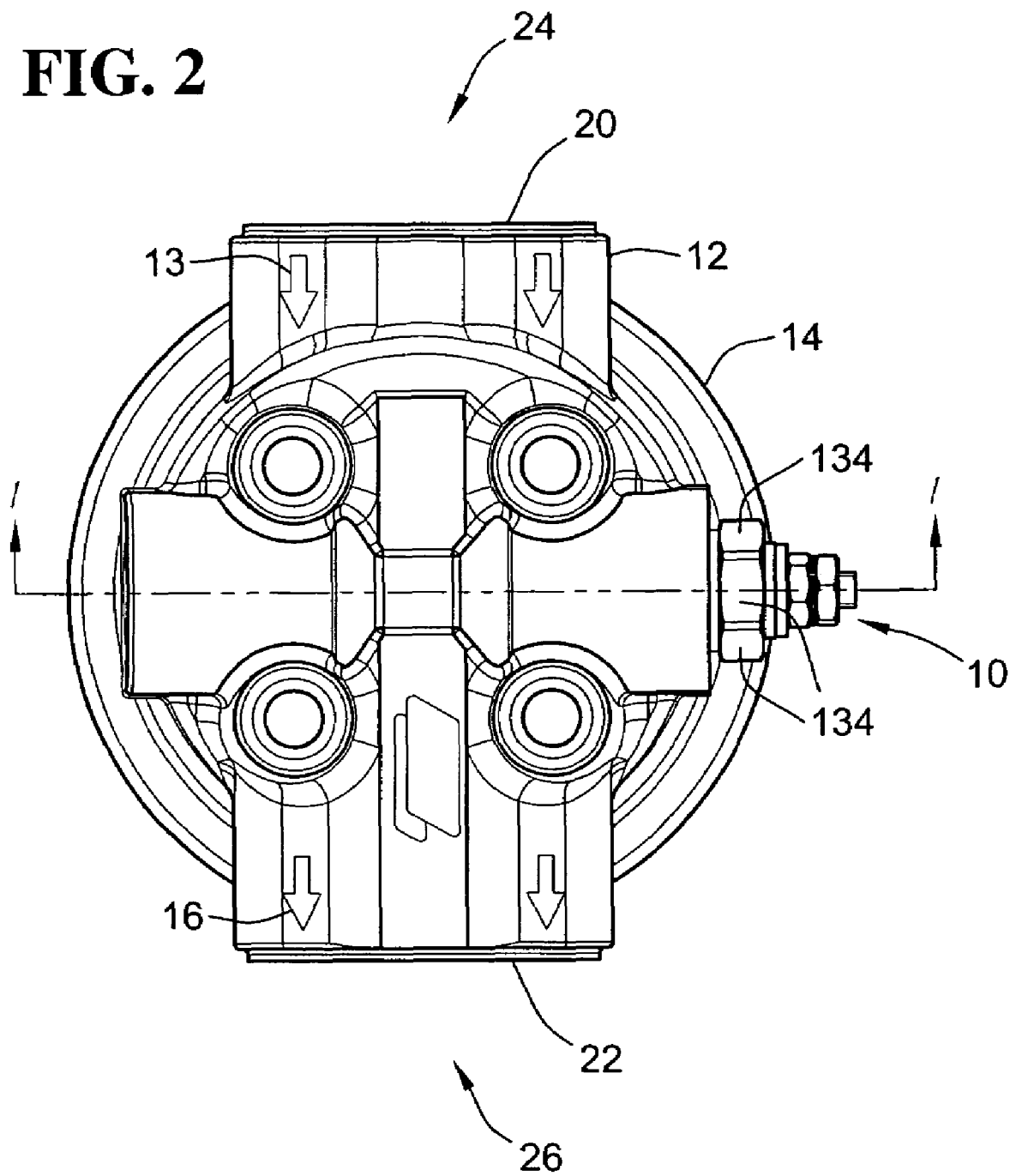
FIG. 2 is a top view of a filter head having a filter attached thereto and having an exemplary embodiment of a differential pressure indicator constructed in accordance with the teachings of the present invention.

Illustrated in FIG. 2, the filter head 12 includes an inlet side 20 and an outlet side 22. The inlet side 20 includes an inlet port 24 that is connected to a dirty fluid supply (not shown), such as an engine, transmission and the like. The outlet side 22 includes an outlet port 26 that is connected to the dirty fluid supply to return the freshly filtered fluid back to the fluid supply.

The filter 14, as shown in FIG. 1, is a typical fluid filter and includes a housing in the form of a canister 30, made of metal or plastic, a cylindrical ring of filter media 32, and an end plate 34. Although one example of a filter is shown, it will be appreciated that different types of filter may be used, including ones with reusable housings and/or axial flow or radial flow media.

In the illustrated example, the end plate 34 is adapted to threadedly connect the filter 14 to the filter head 12. The end plate 34 includes a plurality of inlet ports 36 to allow dirty fluid to pass through the end plate 34 and into a gap 38 between the outer periphery 39 of the filter media 32 and the inner surface 40 of the canister 30. A top end cap 41 and a bottom end cap 43 are sealingly bonded to the ring of filter media 32 by a potting material such as plastisol or other sealing connection. The top end cap 41 includes a hole through which cleaned fluid exits the interior 44 of the filter media 32. Particularly, the clean fluid flow 16 exits the filter media 32 via the end plate 34 that is sealingly inserted into the hole in the end cap 41. The top and bottom end caps 41 and 43 prevent fluid from short-circuiting the filter media 32. As the dirty fluid passes through the filter media 32, illustrated by arrows 42, the fluid is cleaned and then expelled to the interior 44 of the ring of filter media 32.

The interior 44 of the filter media 32 is in fluid communication with a partially internally threaded outlet port 46 of the end plate 34 which threadedly connects to an externally threaded outlet passage 48 of the filter head 12. The outlet passage 48 is in fluid communication with the outlet port 26 which allows the cleaned fluid to exit the filter head 12 and be returned to the fluid supply.

The inlet port 24 (see FIG. 2) of the filter head 12 is in fluid communication with an inlet passage 50 within the filter head 12. The inlet passage 50 is in fluid communication with the plurality of inlet ports 36 in the end plate 34 to allow the dirty fluid flow 13 to enter the filter 14 from the filter head 12.

The filter head 12 includes an upstream indicator passage 54 that is in fluid communication with the inlet passage 50 and communicates fluid pressure of dirty fluid to the differential pressure indicator 10. The filter head 12 further includes a downstream indicator passage 56 that is in fluid communication with the outlet port 26 and allows a portion of clean fluid to flow to the differential pressure indicator 10. It will be appreciated that the filter 14 is configured such that dirty fluid cannot bypass the ring of filter media 32.

The differential pressure indicator 10 is arranged to sense the pressure drop across the filter media 32. Particularly, it senses the pressure differential between the high pressure dirty fluid upstream from the filter media 32 and the lower pressure clean fluid downstream from the filter media 32. As the filter media 32 filters particles from the dirty fluid flow, the filtered contaminants begin to restrict the flow of the fluid, arrow 42, through the filter media 32 and increase the pressure drop and differential across the filter media 32.

The differential pressure indicator 10 of the present invention uses a piston assembly to monitor the pressure differential across the filter media 32. By merely changing and/or rearranging only a minimal number of parts, the differential pressure indicator 10 of the present invention may be configured to have either open circuit logic, as in an embodiment illustrated in FIG. 3a, or have closed circuit logic, as in an embodiment illustrated in FIG. 5a, as will be more fully explained and illustrated below.

Figure 3A:
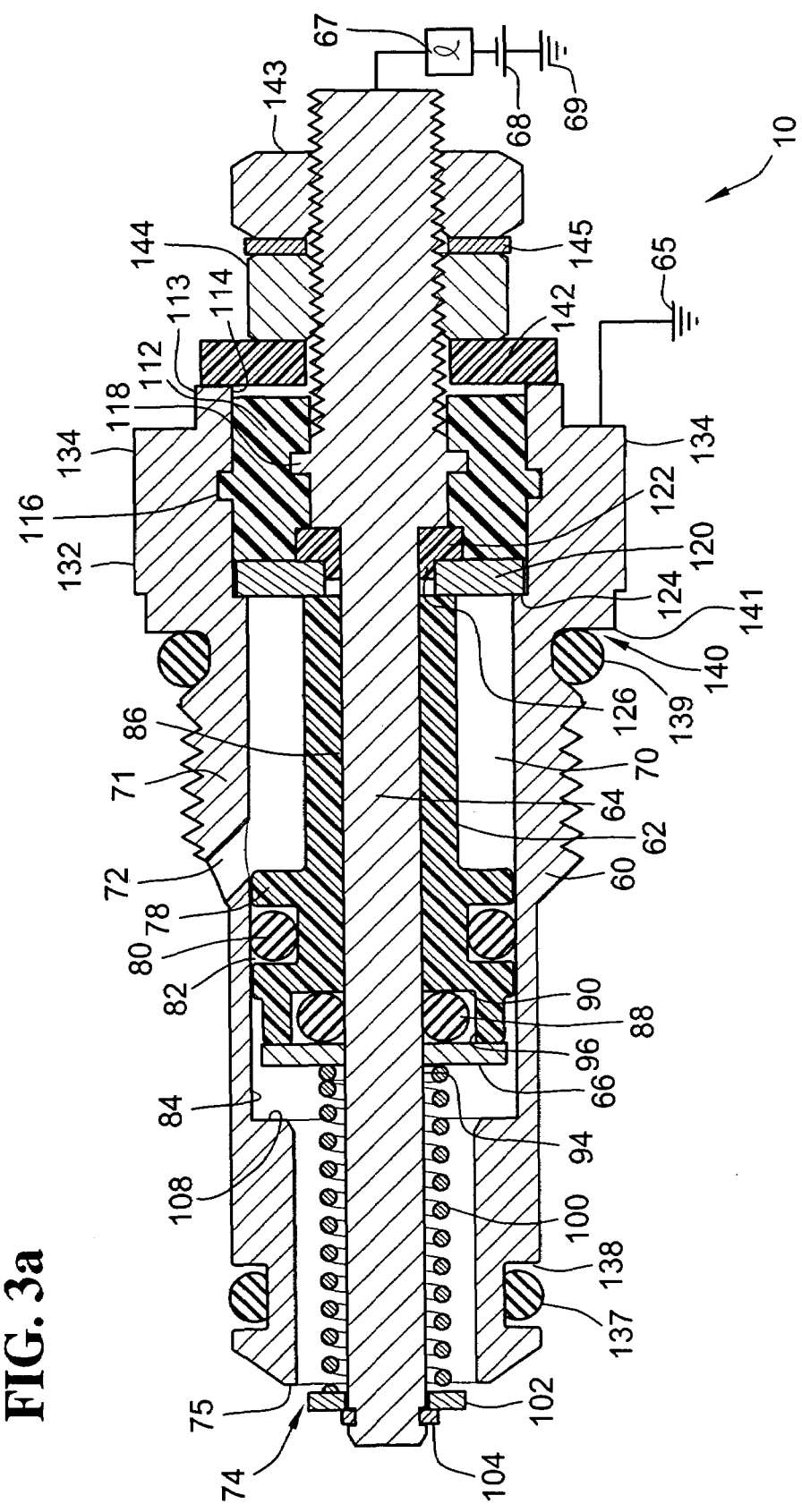
FIG. 3a is an enlarged cross-sectional illustration of the differential pressure indicator of FIGS. 1 and 2 having generally open logic and shown in an open condition.

Referring to FIG. 3a, the differential pressure indicator 10 includes an indicator housing 60, a piston 62 and a post 64. The indicator housing 60 and the post 64 are made from metal or other electrically conducting material. The piston 62 may be an electrically conducting material or an electrically insulating material and may be one piece or made from multiple pieces such as in an assembly. In the illustrated embodiment of FIG. 3a, the piston 62 is made from an electrically insulating material, such as plastic. The differential pressure indicator 10 functions as a switch to open or close an electrical circuit. The electrical circuit is opened or closed when the piston 62 moves in response to the pressure differential between the dirty fluid flow and clean fluid flow reaching a predetermined value.

It is a feature of the present invention that the piston 62, the primary moving component of the differential pressure indicator 10, and the post 64 on which the piston 62 moves are contained within the indicator housing 60 to substantially protect the components. This substantially reduces any damage that may occur to the components of the differential pressure indicator 10 if it is dropped or mishandled during installation. Furthermore, by having all of the components secured to the housing 60, the differential pressure indicator 10 is a single unit that is very easy to install without a significant fear of losing any parts.

The electrical circuit of the differential pressure indicator 10 is in an open condition in FIG. 3a such that the circuit is broken preventing electricity from flowing therethrough. The electrical circuit includes at least a first ground 65 (typically the filter head which is connected to an engine block or a transmission housing), the indicator housing 60, the post 64, a metal contact washer 66, a visual or audio indicator 67 to signal the operator when the filter 14 needs maintenance, an input voltage source 68 and a second ground 69.

The indicator 67 may include electrical leads that are soldered to the post 64 or other mechanical means of fastening such as the illustrated nuts 144, and 145 or other devices such as plugs, clips, electrical connectors and the like. Furthermore, the leads connecting the differential pressure indicator 10 to the rest of the circuit may be connected to the post 64 internal to the housing 60. In such an embodiment, it is preferable that the portion of the leads extending into the housing 60 are sealed preventing any exposure to the external environment.

Figure 3B:
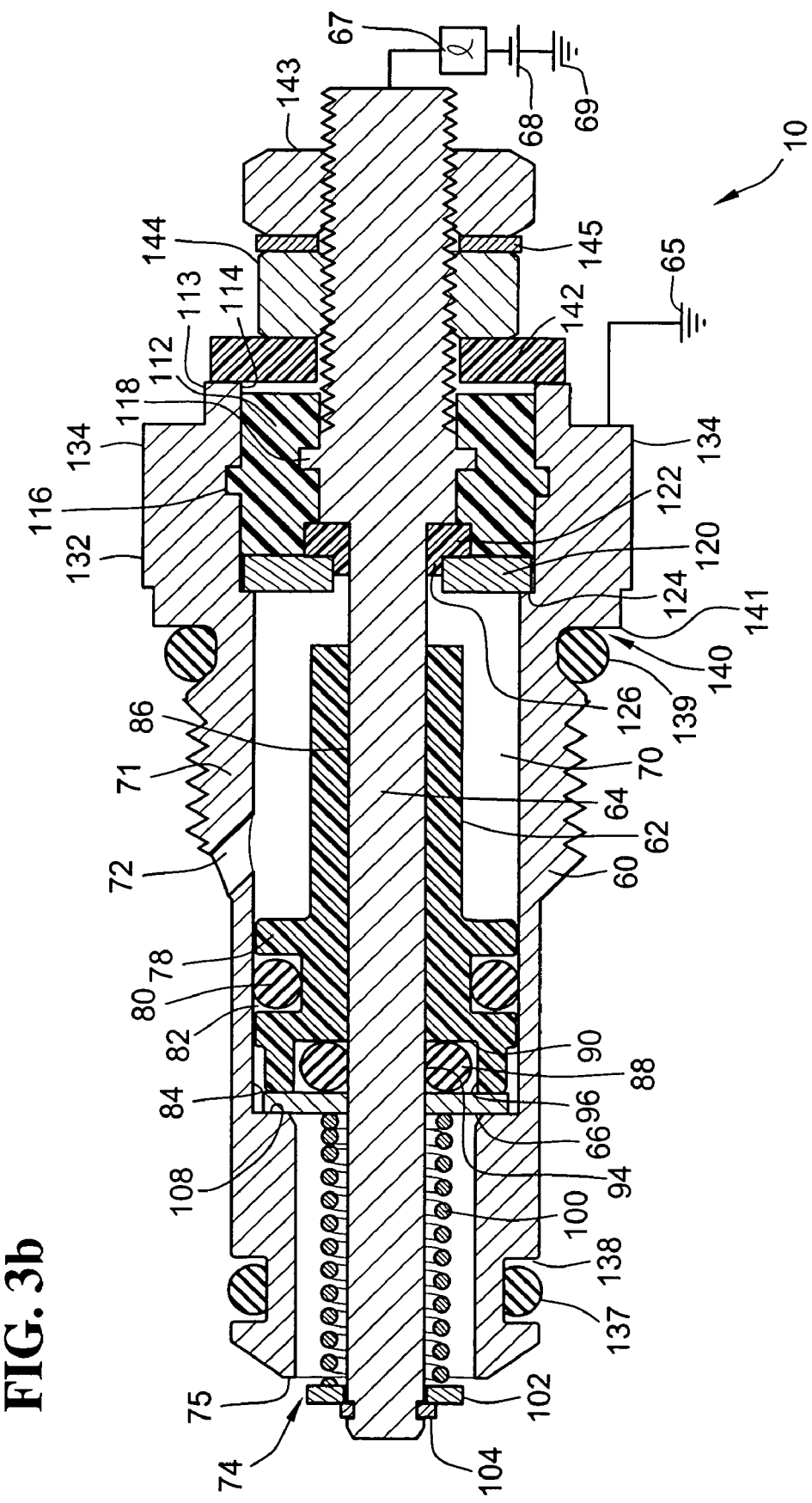
FIG. 3b is an enlarged cross-sectional illustration of the differential pressure indicator of FIG. 3a shown in a closed condition.

The circuit is open when the post 64, which functions as an electrode having a first electric potential, is not electrically connected to the indicator housing 60, which functions as an electrode having a second electric potential different from the first electrical potential, by the metal contact washer 66. As shown in FIG. 3b, the circuit is closed when the metal contact washer 66 electrically connects the indicator housing 60 to the post 64, as will be more fully explained below.

The embodiment of the differential pressure indicator 10 in FIGS. 3a and 3b generally operates on what will be referred to as open logic. With open logic, the electrical circuit is generally in an open or broken condition, as shown in FIG. 3a, such that electrical current does not flow through the circuit when the filter 14 does not need maintenance. However, once the filter 14 becomes sufficiently restricted with filtered contaminants such that the filter 14 needs to be replaced or cleaned, the pressure differential between the dirty and clean fluid flows will have reached a predetermined level such that the piston 62 actuates to close the circuit, as shown in FIG. 3b. Once the circuit closes, electricity flows through the circuit and activates the audible or visual indicator 67 to warn the operator that the filter 14 needs maintenance.

Figure 5A:
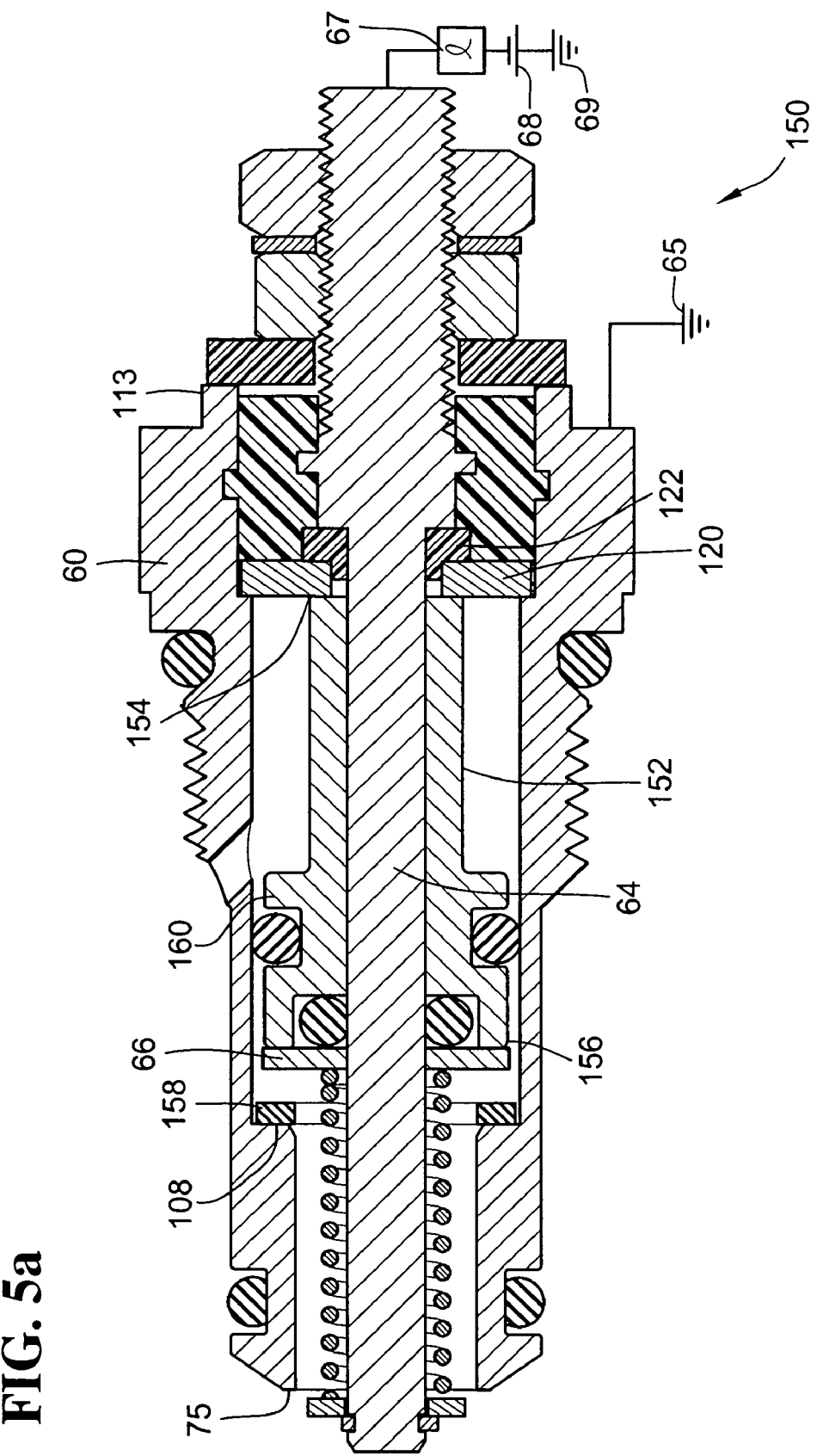
FIG. 5a is an enlarged cross-sectional illustration of an another embodiment of a differential pressure indicator of the present invention having generally closed logic shown in a closed condition.
Figure 5B:
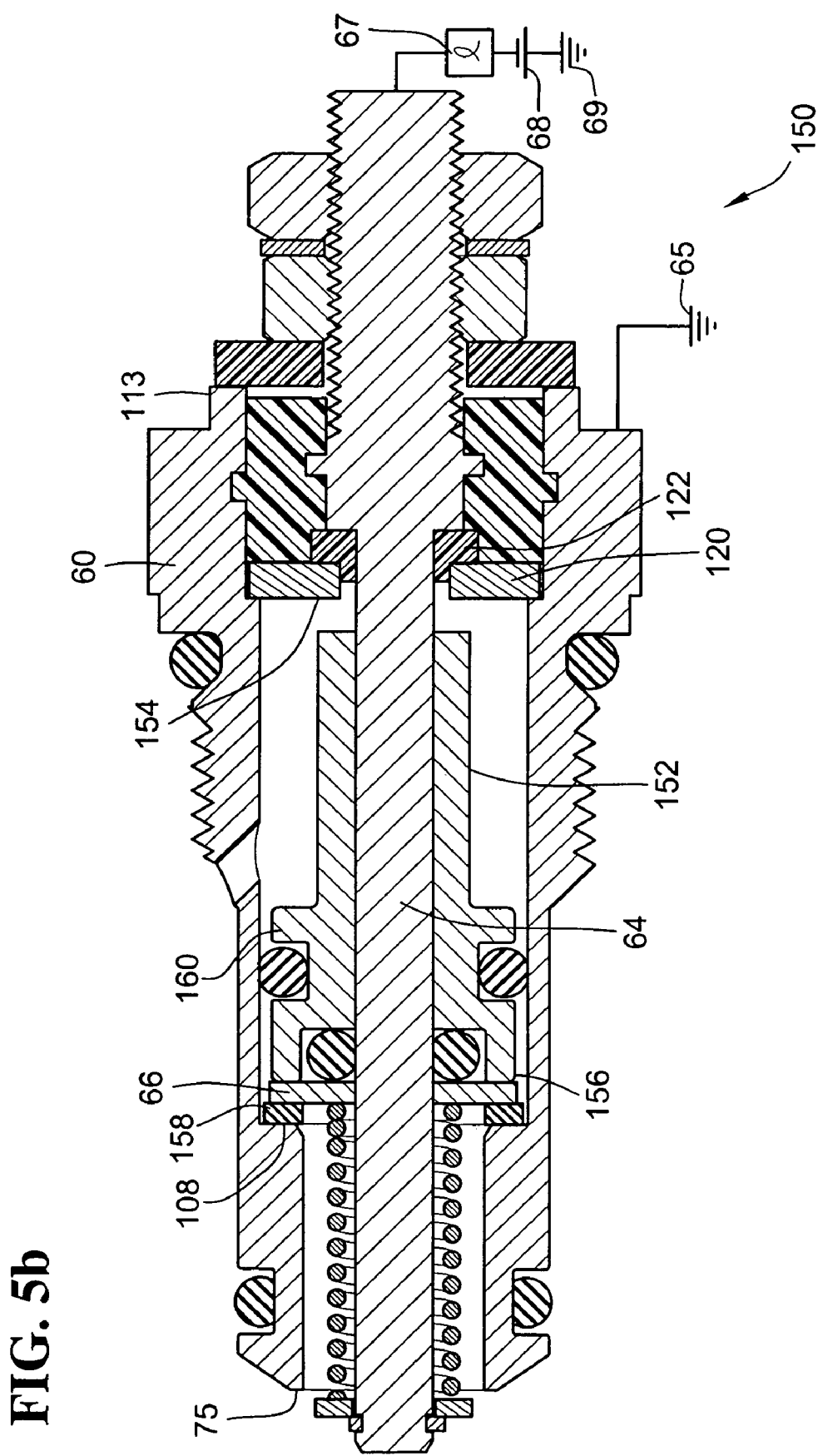
FIG. 5b is an enlarged cross-sectional illustration of the differential pressure indicator of FIG. 5a. shown in an open condition.
Figure 6:
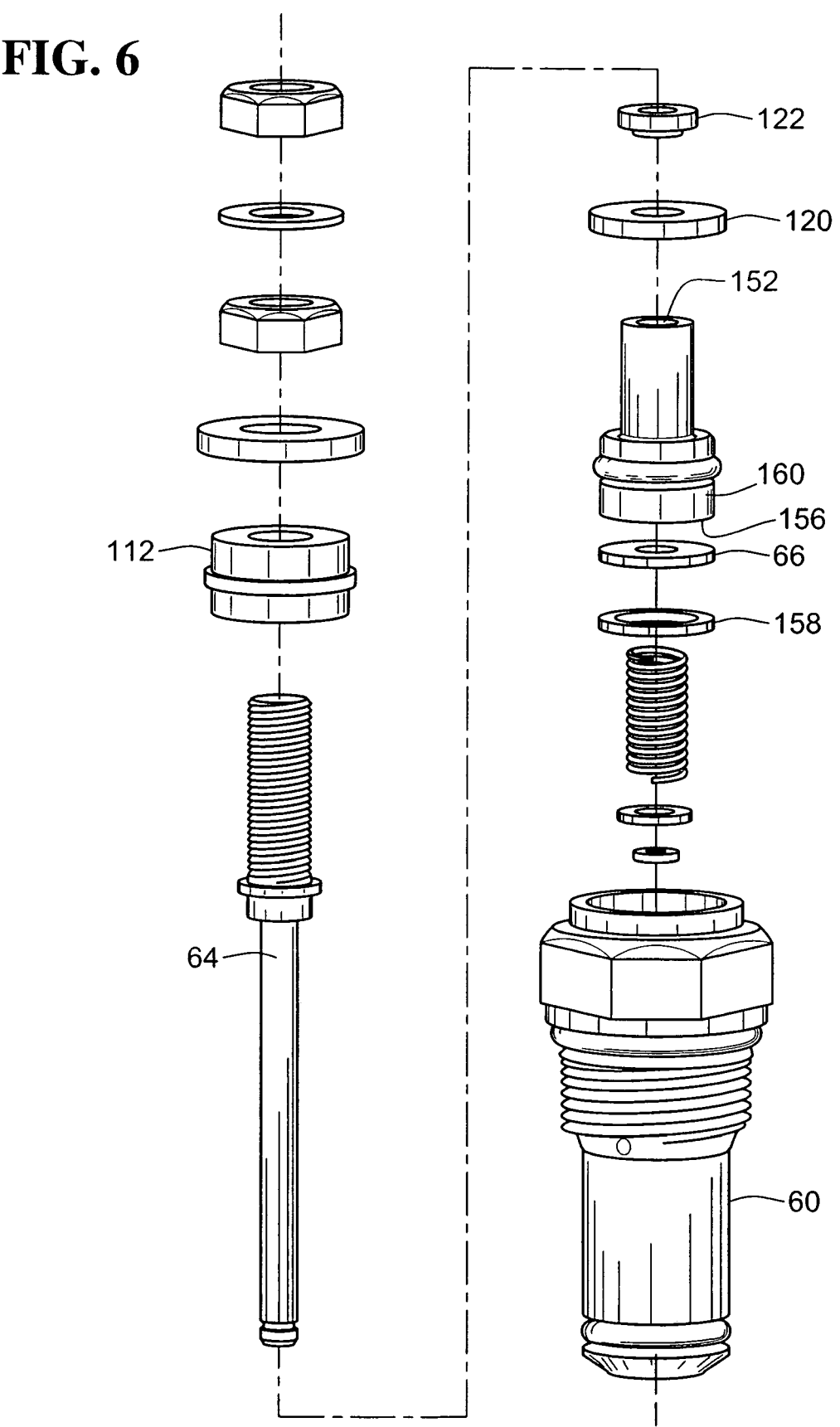

It will be appreciated that a differential pressure indicator having closed logic, shown in FIGS. 5a and 5b, operates in the opposite way. Particularly, the electrical circuit through the differential pressure indicator 10 is generally closed (see FIG. 5a) when the filter is clean, and the circuit is opened or broken (see FIG. 5b) such that electricity cannot flow through the circuit when the filter needs maintenance.

As illustrate in FIG. 3a, the indicator housing 60 includes an externally threaded portion 71 for threadedly connecting the differential pressure indicator 10 to the filter head 12. The indicator housing 60 includes an inner bore 70, or chamber, extending the entire length of the indicator housing 60. The piston 62 and post 64 are positioned within the inner bore 70. It is a benefit of the present invention that the piston 62 is mounted within and in contact with the inner bore 70 of the indicator housing 60 rather than directly into and in contact with the filter head 12 itself because the inner bore 70 of the indicator housing 60 can be easily and precisely machined with a smooth interior surface to provide a smoother and cleaner sliding interaction with the piston 62.

To monitor the pressure differential across the filter media 32, one side of the piston 62 is plumbed to the upstream (dirty) fluid flow and the other side of the piston 62 is plumbed to the downstream (clean) fluid flow. Thus, the same pressure differential exists across the filter media 32 and the piston 62.

Specifically, the indicator housing 60 includes a first inlet port 72 through which dirty fluid enters the inner bore 70. The first inlet port 72 is in fluid communication with the upstream indicator passage 54 (see FIG. 1) of the filter head 12 and is positioned on a first side of the piston 62. A second inlet port 74 at a first end 75 of the indicator housing 60 allows clean fluid to enter the inner bore 70, on a second opposite side of the piston 62. The second inlet port 74 is in fluid communication with clean fluid via the downstream indicator passage 56 (see FIG. 1) of the filter head 12.

As shown in FIG. 3a, the piston 62 is sealed radially between and can slide axially relative to the post 64 and the indicator housing 60. The piston head 78, which is positioned within the inner bore 70, separates the dirty fluid on one side of the piston 62 from the clean fluid on the other side of the piston 62. A first o-ring 80 carried in an annular groove 82 radially seals the piston head 78 within the inner bore 70. The piston 62 is carried by the post 64 via an axially extending inner bore 86 through the piston 62. To prevent fluid from passing through the inner bore 86 of the piston 62, a second o-ring 88 radially seals the piston 62 relative to the post 64. The second o-ring 88 is axially positioned between a radially inward extending shoulder 90 of the piston head 78 and the metal contact washer 66. The second o-ring 88 is radially positioned between the outer surface 94 of the post 64 and an inner surface 96 of a portion of the piston head 78.

As the filter media 32 filters the dirty fluid, the filtered contaminants will increase the pressure differential across the filter media 32, as explained previously. The dirty fluid will be at a higher pressure than the clean fluid. To prevent the piston 62 from being prematurely actuated before the filter has become sufficiently dirty to require maintenance, i.e. before the predetermined pressure differential across the filter media has been attained, a coil spring 100 is positioned on the clean fluid side of the piston head 78 to bias the piston 62. The coil spring 100 is carried by the post 64 and is axially positioned between the metal contact washer 66 and a spring retainer washer 102 secured to the end of the post 64 by a c-clip 104. The c-clip 104 snaps into a groove in the outer surface 94 of the post 64. The second inlet port 74 is provided between the spring retainer washer 102 and the first end 75 of the indicator housing 60. The outside diameter of the coil spring 100 is sized relative to the inner diameter of the indicator housing 60 such that the coil spring 100 cannot contact the inner surface of the indicator housing 60.

Furthermore, the coil spring 100 is configured and sized such that it does not significantly affect the clean fluid flow within the inner bore 70 that is in contact with the piston head 78 on the clean fluid side.

Once the filter media becomes sufficiently clogged that the predetermined pressure differential is attained, the pressure of the dirty fluid acting on the piston head 78 will create a force that will be sufficiently larger than the force acting on the clean fluid side of the piston head 78 by the pressure of the clean fluid and the coil spring 100. This larger force on the dirty side of the piston head 78 will cause the piston 62 to axially travel through the inner bore 70 towards the first end 75 of the indicator housing 60 and compress the coil spring 100. It will be appreciated by one of skill in the art that the predetermined pressure differential at which the piston 62 will begin to axially move towards the first end 75 can be varied by changing the stiffness of the coil spring 100 to allow for use of the differential pressure indicator under different operating conditions.

Once the piston 62 has been sufficiently actuated such that the metal contact washer 66, which provides an electrical contact for the post 64, contacts a contact shoulder 108, which provides a first electrical contact for the indicator housing 60, the electrical circuit becomes closed and/or completed, as shown in FIG. 3b. Particularly, the metal contact washer 66 electrically connects the metal indicator housing 60 and the metal post 64. In an embodiment, if the metal contact washer 66 does not electrically contact the post 64, the electrical connection between the metal contact washer 66 and the post 64 may be made via the coil spring 100, c-clip 104 and spring retainer washer 102. Once the electrical connection is made, the circuit is in the "closed" condition and the operator is then alerted by the visual or audible indicator 67 that the filter needs maintenance.

The post 64 is secured to and fixed within the indicator housing 60 by a potting material 112. It will be appreciated that the potting material 112 is an insulating material such that the potting material 112 does not close the circuit by making an electrical connection between the post 64 and the indicator housing 60. The potting material 112 secures the post to a second end 113 of the indicator housing 60. To secure the post 64, an interior surface 114 of the indicator housing 60 includes an annular groove 116 and the post 64 includes a radially outward extending annular flange 118. During assembly, the potting material 112 flows into the annular groove 116 and around the annular flange 118. Once the potting material 112 hardens, the potting material 112 secures the post 64 to the indicator housing 60.

The differential pressure indicator 10 further includes a metal washer 120 and a plastic shoulder washer 122 to position the post 64 within the indicator housing 60 as well as assist manufacturing and assembling the differential pressure indicator 10. The metal washer 120 abuts a radially extending abutment shoulder 124 of the indicator housing 60. The plastic shoulder washer 122 abuts and is carried by the metal washer 120. The inner diameter of the plastic shoulder washer 122 is sized to the outer diameter of a portion of the post 64. The plastic shoulder washer 122 includes a spacer portion 126 that extends into the hole of the metal washer 120 and radially between the metal washer 120 and the post 64. The plastic shoulder washer 122 insulates the post 64 from the metal washer 120 which is in electrical contact with and provides a second electrical contact for the indicator housing 60.

During manufacturing and assembly, the metal washer 120 and plastic shoulder washer 122 prevent the potting material 112 from flowing axially too far into the inner bore 70 of the indicator housing 60. In addition, the metal washer 120 and plastic shoulder washer 122 axially position and radially center the post 64 within the indicator housing 60.

Figure 4:
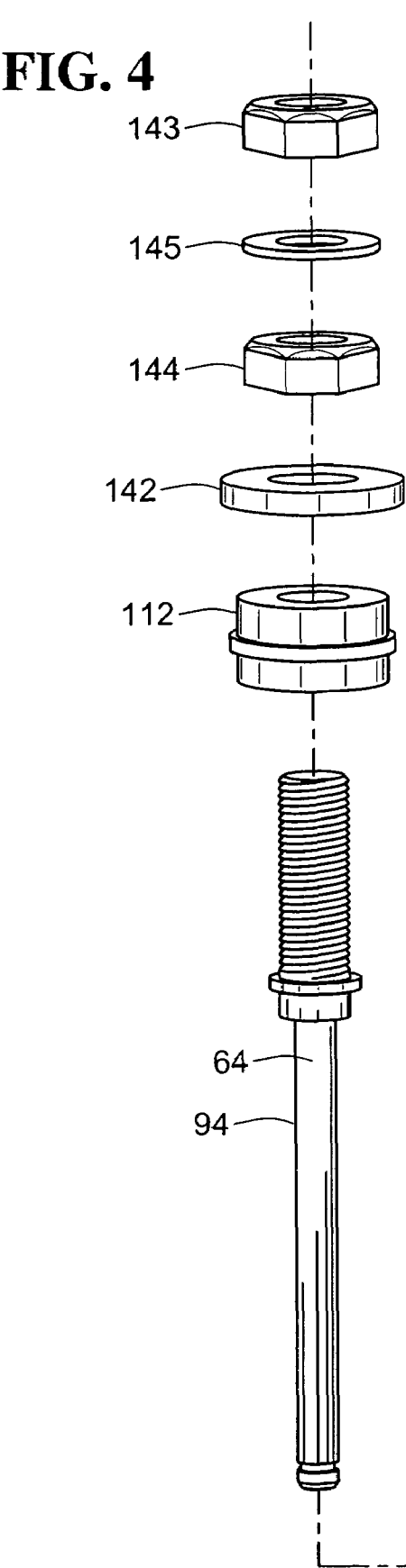
Figure 4:
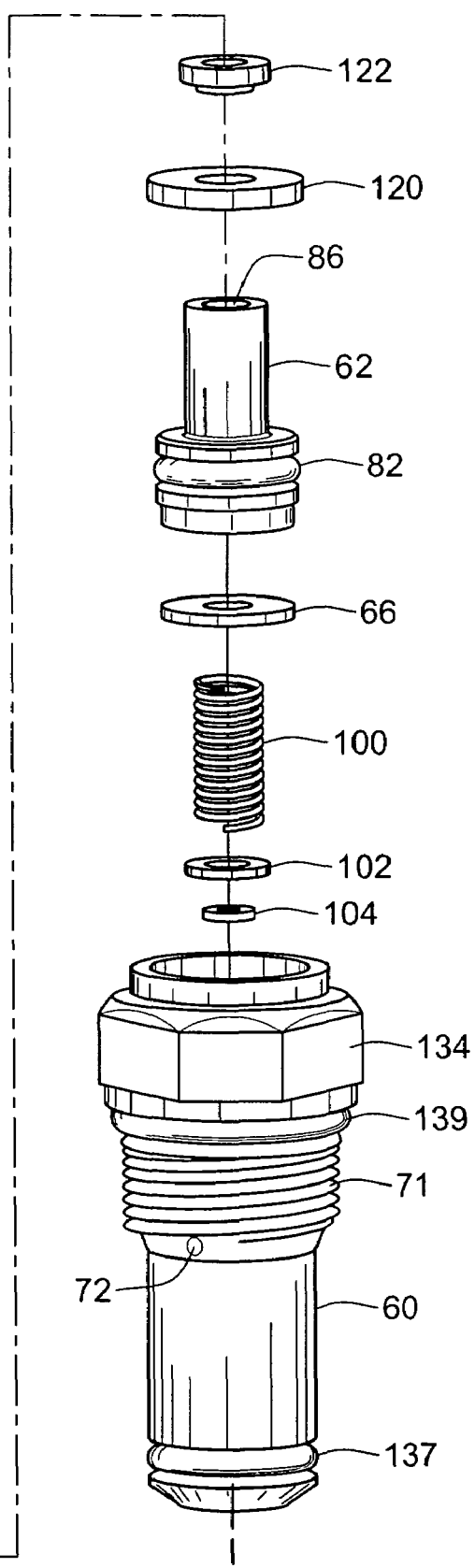

As shown in FIGS. 2 and 4, the outer periphery 132 of a portion of the indicator housing 60, near the second end 113, includes sides 134 that establish a hexagonal shape. The hexagonal shape allows a tool (not shown) to engage the differential pressure indicator 10 while threading the differential pressure indicator 10 into the filter head 12, as shown in FIGS. 1 and 2.

In the embodiment of FIGS. 3a and 3b, which illustrates the differential pressure indicator configured in the normally open condition, the piston 62 is made of a plastic or other insulating material. This prevents the piston 62, particularly, the end opposite the piston head 78, from electrically connecting to the metal washer 120 and prematurely electrically connecting the metal post 64 to the metal indicator housing 60 and "closing" the electrical circuit. Thus, the only time the circuit can be closed is when the metal contact washer 66 contacts the housing 60 after the piston 62 has been actuated towards the first end 75 of the indicator housing 60 in response to a predetermined pressure differential being attained. Alternatively, instead of forming the piston of an insulating material, an electrical insulator could be rearranged and positioned between a metal piston and the metal washer 120 to prevent the metal piston from short-circuiting the differential pressure indicator by connecting the piston to the metal washer 120. Alternatively, if a metal piston is used, the metal washer 120 could be replaced with an insulating washer to prevent the circuit from being closed prematurely, rather than placing an insulator between the metal washer 120 and a metal piston.

To seal the downstream flow passage 56 from the upstream flow passage 54 within the filter head 12 when the differential pressure indicator 10 is secured in the filter head 12, the differential pressure indicator 10 includes a first o-ring 137 in sealing contact with the exterior 132 of the indicator housing 60. Particularly, the first o-ring 137 is carried and seated in a first annular groove 138 in the outer surface of the indicator housing 60. The annular groove 138 and o-ring 137 are located axially between the first and second inlet ports 72, 74 of the indicator housing 60. To seal the differential pressure indicator 10 within the filter head 12, the differential pressure indicator 12 includes a second o-ring 139 in sealing contact with the exterior 132 of the indicator housing 60. The second o-ring 139 is carried in an annular groove 140 between the threaded portion 71 and a radially outward extending shoulder 141 of the indicator housing.

As indicated previously, it is a feature of this invention that the differential pressure indicator 10 having open logic is substantially similar to and includes substantially the same components as a differential pressure indicator having closed logic. An alternative embodiment of such a differential pressure indicator 150 having closed logic in accordance with the present invention is illustrated in FIGS. 5a and 5b.

In this embodiment, the electrical circuit is generally closed (see FIG. 5a) such that electricity flows through the circuit when the filter does not need to be replaced and the circuit is broken/opened (see FIG. 5b) when the filter needs to be replaced. As indicated previously, the components of this differential pressure indicator are substantially the same as the previous "open logic" embodiment. However, in this embodiment, the piston 152 is made from a metal or other electrically conducting material. As shown in FIG. 5a, a first end 154 of the piston 152 acts as the electrical contact for the post 64 to connect the post 64 to the second electrical contact of the indicator housing 60. In the standard unclogged/clean filter condition, the first end 154 of the piston 152 is in contact with the metal washer 120 that carries the plastic shoulder washer 122 and, as explained previously, is in electrical contact with the indicator housing 60 and provides the second electrical contact for the indicator housing 60.

In this embodiment, the electrical circuit includes a first ground 65 (typically the engine block or transmission housing), the indicator housing 60, the metal washer 120, the piston 152, the post 64, a visual or audible indicator 67 to signal to the operator that the filter is plugged, an input voltage source 68 and a second ground 69. The circuit is closed when the piston 152 contacts the metal washer 120. The circuit is open (see FIG. 5*b*) when the piston 152 is not electrically connected to the metal washer 120, or any other electrical contact of the indicator housing 60.

Once the filter becomes sufficiently clogged such that the pressure differential between the dirty fluid and the clean fluid reaches a predetermined value, the piston 152 will move axially along the post 64, as explained previously. However, as shown in FIG. 5*b* this axial movement will open the circuit because the piston 152 will no longer contact the metal washer 120. To prevent the metal contact washer 66 at the other end 156 of the metal piston 152 from contacting the contact shoulder 108 of the indicator housing 60 and re-closing the electrical circuit, this embodiment further includes an insulating washer 158 that insulates the metal contact washer 66 from the contact shoulder 108. It will be appreciated that, in an embodiment in which the piston 152 is configured to directly and continuously contact the post 64, the metal contact washer 66 could be eliminated and replaced directly by an insulating washer of an appropriate size.

The embodiment, which has closed logic, can be easily converted to and configured as a differential pressure indicator having open logic by merely changing the location of the insulating washer 158. Particularly, the insulating washer 158 would be positioned on the dirty fluid side of the piston head 160 between the metal washer 120 and end 154 of the metal piston 152 rather than on the clean fluid side of the piston head 160 between the contact shoulder 108 and the metal contact washer 66. The ability to manufacture a differential pressure indicator having either open logic or closed logic by merely changing the position of an insulating washer is a great cost savings benefit of this invention.

The differential pressure indicator may be advantageously manufactured and/or configured with either open logic or closed logic by rearranging the components or merely adding and/or changing a minimal number of components. With reference to FIGS. 3*a* and 5*a*, the method of configuring and providing a differential pressure indicator having either open circuit or closed circuit logic includes the following steps.

The method first includes the step of providing an indicator housing 60 having an inner bore 70, first and second inlet ports 72 and 74, and first and second spaced apart electrical contacts 108 and 120, either of which may be used. The first and second inlet ports 72 and 74 are in fluid communication with the inner bore 70. The spaced apart electrical contacts 108 and 120, as illustrated in FIGS. 3*a* and 5*a*, may be in the form of a contact shoulder 108 extending radially inward from the indicator housing 60 and a metal washer 120 in electrical contact with the indicator housing 60, respectively.

The method further includes the step of selecting between insulating arrangements that position an insulating material between a third electrical contact and one of the first and second electrical contacts of the indicator housing 60 to provide for a desired type of logic. Specifically, to provide for closed circuit logic, as shown in FIG. 5*a*, a first insulating arrangement will be selected and provided. The first insulating arrangement has an insulating material, insulating washer 158, positioned between the first electrical contact, contact shoulder 108, and the third electrical contact, metal contact washer 66, to prevent electrical contact therebetween. To provide for open circuit logic, as shown in FIG. 3*a*, a second insulating arrangement will be selected and provided. The second insulating arrangement has an insulating material, which in an embodiment is the piston 62, positioned between the second electrical contact, metal washer 120, and the third electrical contact, metal contact washer 66, to prevent electrical contact therebetween.

The method further includes the step of providing a pressure responsive element configured in accordance with the selected insulating arrangement and including the third electrical contact and an insulating material. The pressure responsive element includes either a plastic piston 62 that integrally incorporates the insulative material (see FIG. 3*a*) or a metal piston 152 which is conductive (see FIG. 5*a*) that is receivable in the inner bore 70 of the indicator housing 60, as explained previously. Furthermore, depending on the selected arrangement and the pressure responsive element, the metal piston 152 or the metal contact washer 66 may provide the third electrical contact. A post 64 exposed to the inner bore 70 will provide an electrical terminal electrically connected to the third electrical contact. The method may further include biasing the pressure responsive element towards the first or second electrical contact. To perform the biasing, a coil spring 100 may be provided.

In a method, as best described with reference to FIG. 5*a*, providing the pressure responsive element according to the first insulating arrangement includes providing a metal piston 152 and a metal contact washer 66. The metal piston 152 and metal contact washer 66 electrically connect to the post 64, directly, or as discussed previously via the coil spring 100. which provides the electrical terminal. An insulating washer 158 will be positioned between the first electrical contact (the shoulder 108) and the third electrical contact (the combination of the piston 152 and the metal washer 66) to prevent electrical connection between the first electrical contact and the third electrical contact, thereby providing closed circuit logic as explained previously. It will be appreciated that in this method, the metal contact washer 66 is optional and could be replaced by a washer of an insulating material (in which the piston would be metal and in continuous electrical contact with the post 64).

In a method, the step of providing a pressure responsive element according to the second selected insulating arrangement merely requires rearranging the position of the insulating washer 158. Particularly, the insulating washer 158 would be positioned between the metal piston 152 and the metal washer 120 to prevent electrical contact between the third electrical contact, the metal piston 152, and the second electrical contact, the metal washer 120.

In another method according to the present invention, which is best described with reference to FIG. 3*a*, the step of providing a pressure responsive element according to the second insulating arrangement includes providing a plastic piston 62 and the metal contact washer 66. The metal contact washer 66 provides the third electrical contact and is electrically connected to the post 64, which provides the electrical terminal. The plastic piston 62 provides the insulating material and is positioned between the second electrical contact, the metal washer 120, and the third electrical contact, the metal contact washer 66, to prevent electrical connection therebetween, thereby providing open circuit logic.

In yet another method, the step of providing a pressure responsive element according to the first insulating arrangement merely requires rearranging the position of the metal contact washer 66 relative to the plastic piston 62. Particularly, the plastic piston 62 would be positioned between the metal contact washer 66 and the contact shoulder 108 to prevent electrical contact therebetween, and provide closed circuit logic.

After providing the pressure responsive element for the selected insulating arrangement, the method includes the step of assembling the components. During assembly, the pressure responsive element (the metal piston 152 or plastic piston 62) is inserted into the inner bore 70 between the first and second inlet ports 72 and 74 to divide the inner bore 70 into first and second pressure chambers. The post 64 is secured to and insulated from the indicator housing 60. The third electrical contact is electrically connected to the post 64.

Thus, by merely selecting an insulating arrangement and rearranging components or replacing a minimal number of components, a differential pressure indicator may be configured and manufactured to have open or closed circuit logic.

The method allows manufacturing both closed circuit and open circuit indicators economically and efficiently because the same or similar components are manufactured for each type of differential pressure indicator reducing tooling costs and increasing the production volume of individual components. After providing the generally universal components, manufacturing one or the other differential pressure indicator merely requires appropriately arranging the components to provide an indicator with the preferred type of logic.

Figure 7:
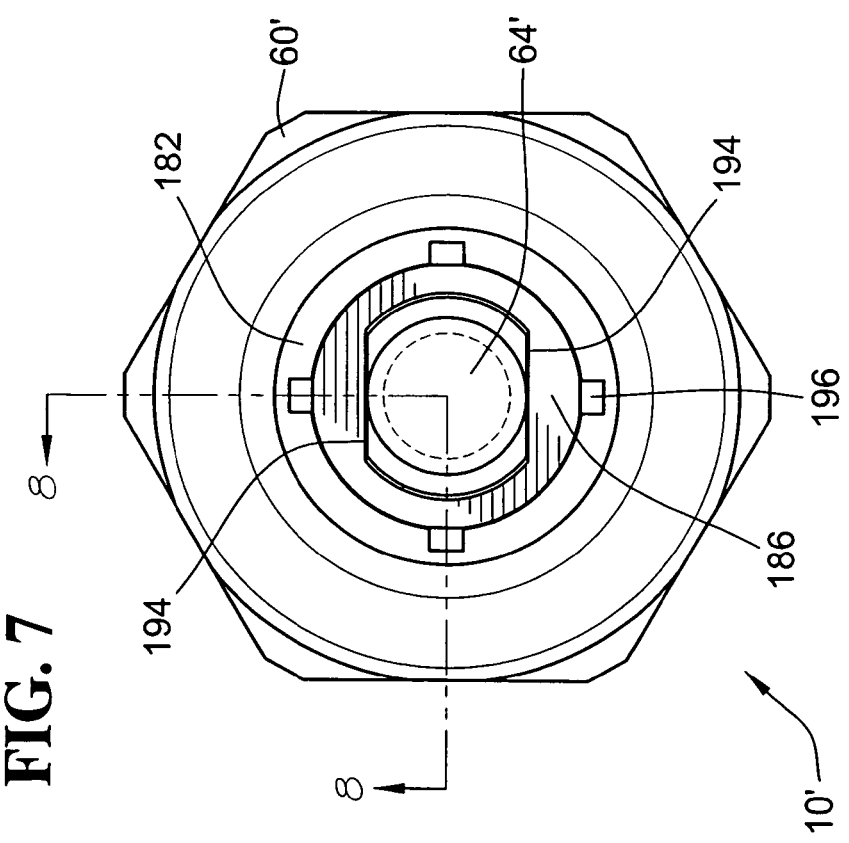
FIG. 7 is a top view of another embodiment of a differential pressure indicator according to the teachings of the present invention.
Figure 8:
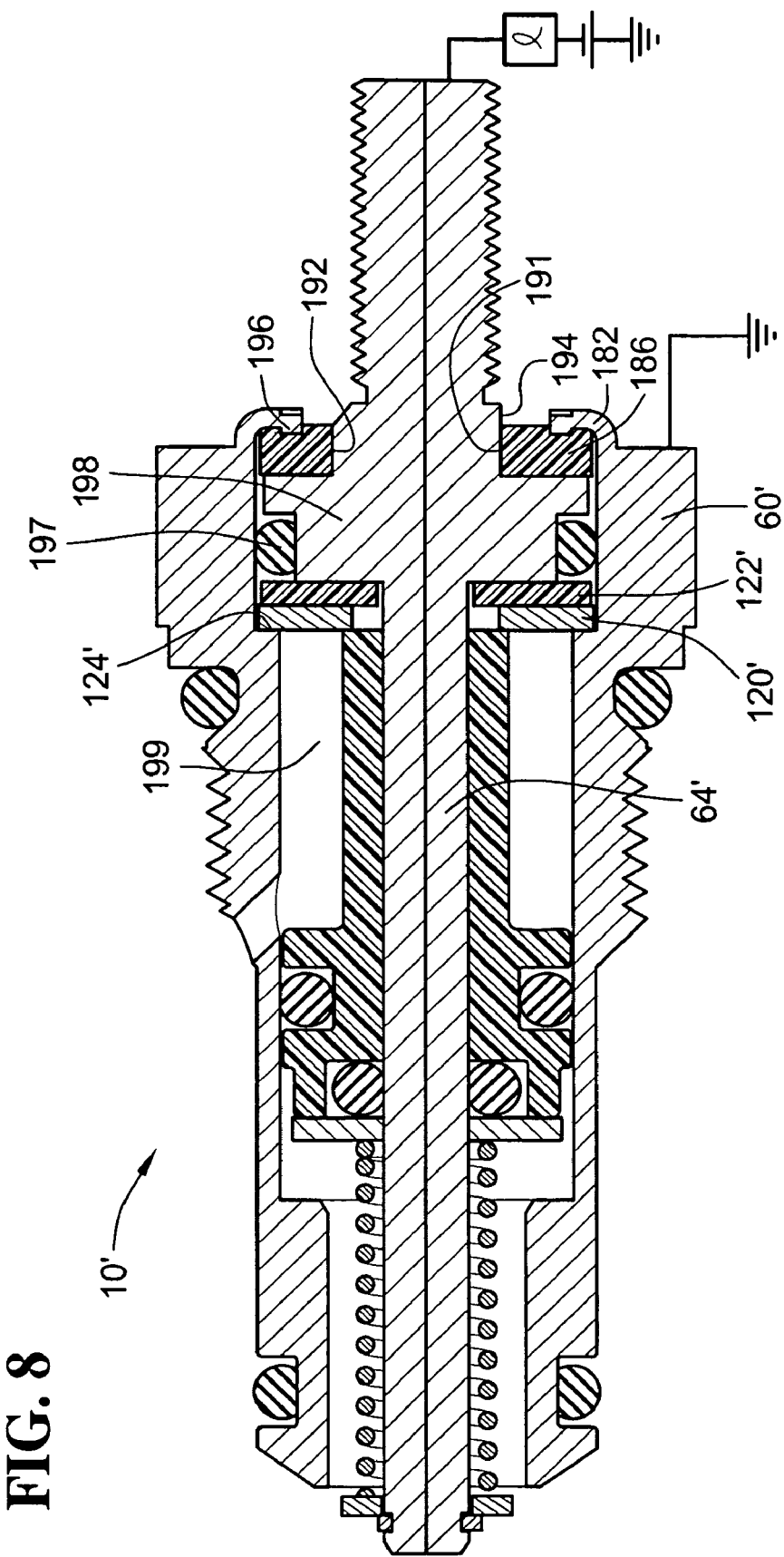
FIG. 8 is a cross-sectional illustration of the differential pressure indicator of FIG. 7 taken about line 8-8.

Another and different embodiment of the present invention is illustrated in FIGS. 7 and 8. This embodiment operates like and is configured much like the previously discussed embodiments except that the post 64' is secured to the indicator housing 60' by swaging a portion of the housing 60', rather than by a potting material. As such, discussion will be limited to the mounting distinctions. In this embodiment, after the post 64' along with several other components of the differential pressure indicator 10' are inserted into the indicator housing 60', a substantially axially extending flange of the housing 60' is bent radially inward during a swaging process to form a radially inward extending flange 182. The radially inward extending flange 182 axially secures the post 64' within the indicator housing 60'.

Specifically, the radially inward extending flange 182 axially abuts and restricts or sandwiches a plurality of components of the differential pressure indicator 10' between itself and a radially extending abutment surface 124'. The radially extending flange 182 of the indicator housing 60' presses axially against a first insulating washer 186. The insulating washer 186 insulates the post 64' from the indicator housing 60'. Insulating washer 186 further acts to prevent the post 64' from rotating relative to the housing 64'.

Figure 9:
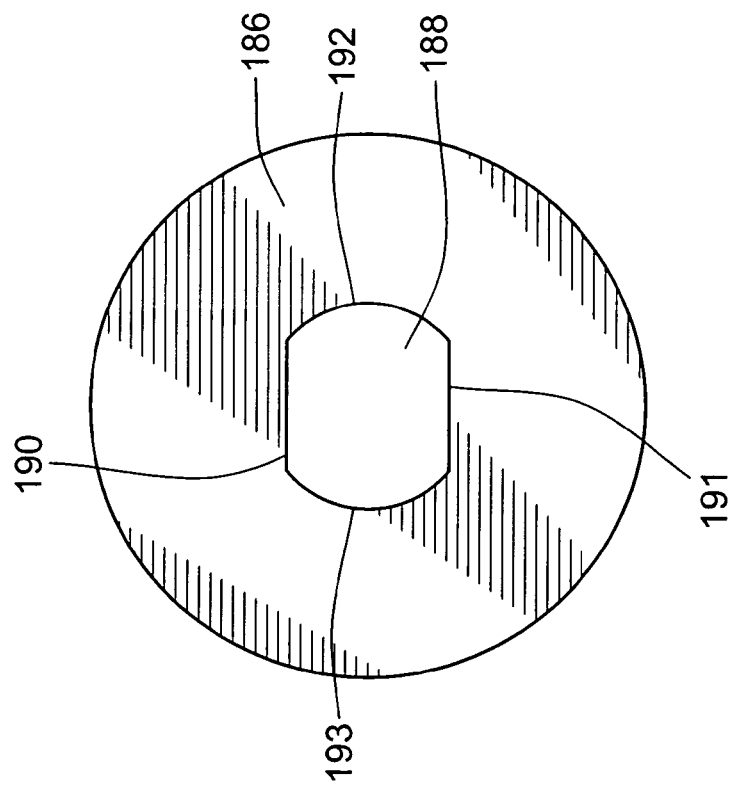
FIG. 9 is a top view illustration of the plastic insulating washer having a non-circular hole for engaging the post of the differential pressure indicator of FIG. 8.

With reference to FIGS. 7 and 9, the hole 188 passing through the insulating washer 186 is not round. In the particular embodiment, the geometry of the hole 188 is provided by two straight parallel sides 190, 191 that connect to two radiused ends 192, 193. The configuration of this embodiment advantageously provides an anti-rotation feature as will be more fully explained below. The anti-rotation feature prevents the post 64' from rotating relative to the housing 60' while the post 64' is rotationally torqued during installation or removal of the differential pressure indicator 10'. This is particularly beneficial while tightening or loosening nuts or other fastener devices (not shown) onto the free threaded end of the post 64' to secure electrical wires to the post 64'.

In the illustrated embodiment, the non-round shape of hole 188 of the insulating washer 186 acts to prevent the post 64' from rotating relative to the insulating washer 186 when the post 64' is inserted therethrough. In an embodiment, the portion of the post 64' that is inserted through the hole 188 is similarly or correspondingly shaped to the cross-section of the hole 188 and includes flats 194 in an outer surface that are sized to prevent the post 64' from rotating within the insulating washer 186. In the illustrated embodiment, flats 194 of the post engage and/or interact with the straight parallel sides 190, 191 of the insulating washer 186, as further illustrated in FIG. 8, to prevent rotation of the post 64'. It will be appreciated to one of skill in the art that other non-circular hole geometries may be implemented such that the post 64' is prevented from rotating relative to the hole 188. For example, but in no way limiting, the hole could be triangular shaped, square, polygonal, oval, oblong, etc.

To further prevent the post 64' from rotating relative to the indicator housing 60', in an embodiment of the present invention, the radially inward extending flange 182 of the indicator housing 60' includes one or more axially extending protrusions 196 or stakes that engage the insulating washer 186, as illustrated in FIG. 8. These protrusions 196 or stakes further prevent the insulating washer 186, and consequently the post 64' inserted therethrough, from rotating relative to the indicator housing 60' while applying torque loads to the post 64'.

For axially positioning the post 64' relative to the indicator housing 60', the post 64' includes a radially outward projecting portion 198 that is sandwiched between the insulating washer 186 and another insulating washer 122'. Consequently, the radially outward projecting portion 198 of the post 64' has a larger outer diameter than the inner diameter of either insulating washers 186, 122'. The second insulating washer 122' further prevents the post 64' from prematurely contacting the indicator housing 60' or a metal contact washer 120' that is in electrical contact with the indicator housing 60'. The second insulating washer 122' presses against the metal contact washer 120' that abuts with the radially inward projecting abutment surface 124' of the indicator housing 60'. Ultimately, the first insulating washer 186, the radially outward projecting portion 198 of the post 64', the second insulating washer 122' and the metal contact washer 120' are interposed and sandwiched between the radially inward extending flange 182 and the radially projecting abutment surface 124' of the indicator housing 60' to secure the post 64' within the housing 60'.

An o-ring 197 is positioned radially between a radially inner surface of the indicator housing 60' and an outer radial surface of the post 64', as well as axially between a stepped portion of the radially outward projecting portion 198 of the post 64' and the second insulating washer 122'. The o-ring 197 seals the inner bore 199 of the indicator housing 60' of the differential pressure indicator 10'.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of configuring a differential pressure indicator to provide either open circuit logic or closed circuit logic, comprising:
   providing a housing having first and second communication ports and an internal chamber, the housing having first and second electrical contacts in spaced apart relation;
   selecting between a first insulating arrangement wherein the first electrical contact is electrically insulated from a third electrical contact, and a second insulating arrangement wherein the second electrical contact is electrically insulated from the third electrical contact to provide for one of closed circuit logic and open circuit logic;
   providing a pressure responsive element according to the selected one of the first and second insulating arrangements, the pressure responsive element receivable in the internal chamber to divide the internal chamber into first and second pressure chambers, the pressure responsive element including the third electrical contact, the third electrical contact in electrical communication with an electrical terminal insulated from the housing; and
   assembling the housing and the pressure responsive element according to the selected one of the first and second insulating arrangements.

2. The method of claim 1, further comprising biasing the pressure responsive element toward the second electrical contact.

3. The method of claim 1, wherein providing a pressure responsive element includes providing a piston from an insulating material and providing an electrically conducting element to provide the third electrical contact, and wherein assembling includes arranging the electrically conducting element relative to the piston to provide the selected one of the first and second insulating arrangements.

4. The method of claim 1, wherein providing a pressure responsive element includes making a piston from a conductive material to provide at least part of the third electrical contact; and
   arranging an insulating material to prevent electrical contact between the first and the third electrical contacts to provide closed circuit logic.

5. The method of claim 1, wherein providing a pressure responsive element includes providing a piston from a conductive material to provide at least part of the third electrical contact; and
   assembling includes arranging an insulating material to prevent electrical contact between the second and the third electrical contacts to provide open circuit logic.

6. The method of claim 1, wherein the step of assembling further includes swaging at least a portion of the housing to secure the pressure responsive element within the housing.

7. A differential pressure indicator, comprising:
   a housing having an internal chamber and first and second fluid pressure communication ports communicating with the internal chamber, the housing having a first electrical contact for open circuit logic and a second electrical contact for closed circuit logic;
   a post mounted to the housing and insulated relative to the housing to serve as an electrical terminal;
   a piston in the housing dividing the internal chamber into a first pressure chamber and a second pressure chamber, the piston movable in response to a pressure differential between the pressure chambers between a first position in which the piston is urged toward the second electrical contact and a second position in which the piston is urged toward the first electrical contact, the piston including a third electrical contact adapted to complete an electrical circuit between one of the first and second electrical contacts and the post;
   an insulative material arranged between the third contact and one of the first and second electrical contacts to provide for one of open and close circuit logic.

8. The differential pressure indicator of claim 7, further including a spring biasing the movable piston toward one of the first and second electrical contacts.

9. The differential pressure indicator of claim 7, wherein the piston is an electricity conducting material and provides at least part of the third electrical contact and the insulative material is positioned between the first electrical contact and the piston such that the piston provides an electrical connection between the post and the second electrical contact when in the first position.

10. The differential pressure indicator of claim 7, wherein the piston is an electricity conducting material and provides at least part of the third electrical contact and the insulative material is positioned between the second electrical contact and the piston such that the piston provides an electrical connection between the post and the first electrical contact when in the second position.

11. The differential pressure indicator of claim 7, wherein a portion of the piston is plastic providing the insulative material, the piston further including a metal contact washer to provide the third electrical contact, wherein the plastic portion of the piston is positioned between the metal contact washer and the first electrical contact.

12. The differential pressure indicator of claim 7, wherein a portion of the piston is plastic providing the insulative material, the piston further including a metal contact washer to provide the third electrical contact, wherein the plastic portion of the piston is positioned between the metal contact washer and the second electrical contact.

13. The differential pressure indicator of claim 7, wherein one of the first and the second electrical contacts is a shoulder portion extending radially inward from an inner surface of the inner bore and the other of the first and second electrical contacts is a metal washer in electrical contact with the housing.

14. The differential pressure indicator of claim 7, wherein the insulative material is in the form of a plastic washer.

15. The differential pressure indicator of claim 7, wherein the insulative material is in the form of a rubber washer.

16. The differential pressure indicator of claim 7, wherein a portion of the housing is swaged radially inward forming a radially extending flange axially securing the post in the housing.

17. The differential pressure indicator of claim 16, further comprising an insulating washer positioned between and engaged by the swaged portion of the housing and the post, the insulating washer having a non-round aperture and the post having a corresponding non-round portion passing through the aperture preventing rotation of the post relative to the insulating washer.

18. A differential pressure indicator for sensing a pressure differential across a filter configurable to provide either open circuit logic or closed circuit logic, the differential pressure indicator comprising:
   a housing having an inner bore and first and second inlet ports in fluid communication with the inner bore;
   first and second spaced apart electrical contact portions within the inner bore in electrical communication with the housing;
   a post secured within the inner bore and electrically insulated from the housing;
   a piston assembly slidable within the inner bore, the piston assembly providing a third electrical contact portion in electrical communication with the post, the piston assembly configurable to electrically connect the post to the first electrical contact portion and configurable to electrically connect the post to the second contact portion; and
   an electrically insulative material arranged between the piston assembly and one of the first and second electrical contact portions such that the piston assembly may only electrically connect the post to one of the first and second contact portions.

19. The differential pressure indicator of claim 18, wherein the piston assembly comprises a spring, a plastic piston and a metal washer, the plastic piston slidably carried on the post and providing the electrically insulative material, the metal washer providing the third contact portion, the spring biasing the plastic piston toward one of the first and second electrical contact portions.

20. The differential pressure indicator of claim 18, wherein the piston assembly includes a spring and a metal piston, the metal piston provides at least part of the third electrical contact portion, and the electrically insulative material is in the form of a washer.

21. The differential pressure indicator of claim 20 wherein the insulative material is one of rubber and plastic.

22. The differential pressure indicator of claim 18, wherein the first electrical contact portion is a shoulder portion extending radially inward from an inner surface of the inner bore and the second electrical contact is a metal washer in electrical contact with the housing.

23. The differential pressure indicator of claim 18, wherein the piston assembly divides the inner bore into a first pressure chamber and a second pressure chamber, the piston assembly is movable in response to a pressure differential between the pressure chambers between a first position in which the piston assembly is urged toward the second electrical contact portion and a second position in which the piston assembly is urged toward the first electrical contact portion.

24. The differential pressure indicator of claim 18, wherein a portion of the housing is swaged radially inward forming a radially extending flange axially securing the post within the housing.

25. The differential pressure indicator of claim 24, further comprising an insulating washer positioned between and engaged by the swaged portion of the housing and the post, the insulating washer having a non-round aperture and the post having a corresponding non-round portion passing through the aperture preventing rotation of the post relative to the insulating washer.

26. The differential pressure indicator of claim 25, wherein the swaged portion further includes at least one protrusion for engaging the insulating washer.

27. The differential pressure indicator of claim 25, wherein the cross-section of the non-round aperture and the corresponding portion of the post are defined by at least two flat segments.

* * * * *